(12) United States Patent
Rahm et al.

(10) Patent No.: US 11,339,731 B2
(45) Date of Patent: May 24, 2022

(54) METHOD FOR OPERATING AN INTERNAL COMBUSTION ENGINE SYSTEM

(71) Applicant: VOLVO TRUCK CORPORATION, Gothenburg (SE)

(72) Inventors: Fredrik Rahm, Hörby (SE); Johan Carlén Andersson, Lund (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/269,911

(22) PCT Filed: Aug. 23, 2018

(86) PCT No.: PCT/EP2018/072723
§ 371 (c)(1),
(2) Date: Feb. 19, 2021

(87) PCT Pub. No.: WO2020/038575
PCT Pub. Date: Feb. 27, 2020

(65) Prior Publication Data
US 2021/0310448 A1 Oct. 7, 2021

(51) Int. Cl.
*F02M 26/50* (2016.01)
*F02D 41/00* (2006.01)
(Continued)

(52) U.S. Cl.
CPC ......... *F02D 41/0055* (2013.01); *F02M 26/33* (2016.02); *F02M 26/34* (2016.02);
(Continued)

(58) Field of Classification Search
None
See application file for complete search history.

(56) References Cited

U.S. PATENT DOCUMENTS

| 6,435,166 | B1 | 8/2002 | Sato et al. |
| 6,904,898 | B1 * | 6/2005 | Sahlen ............... F02M 26/50 |
| | | | 123/568.12 |

(Continued)

FOREIGN PATENT DOCUMENTS

| CN | 103161615 A | 6/2013 |
| CN | 104121072 A | 10/2014 |

(Continued)

OTHER PUBLICATIONS

International Search Report and Written Opinion dated May 28, 2019 in corresponding International PCT Application No. PCT/EP2018/072723, 8 pages.

(Continued)

*Primary Examiner* — Kevin R Steckbauer
(74) *Attorney, Agent, or Firm* — Venable LLP; Jeffri A. Kaminski

(57) ABSTRACT

The invention relates to a method for operating an internal combustion engine system (2), wherein the internal combustion engine system (2) is provided with an air intake duct (3), an exhaust gas duct (4) and an exhaust gas recirculation (EGR) system (5), wherein the EGR system (5) comprises an EGR conduit (6) that fluidly connects the exhaust duct (4) and the intake duct (3), and wherein a gas feeding device (7) configured to feed exhaust gas from the exhaust duct (4) to the intake duct (3) is arranged in the EGR conduit (6). The method is characterized in that it comprises the step of: providing a flushing liquid in the EGR conduit (6) upstream of the EGR gas feeding device (7) so as to flush and clean the EGR gas feeding device (7). The invention also relates to an internal combustion engine system (2) configured for being operated by such a method and to a vehicle (1) provided with such an engine system (2). The invention further relates to means for controlling the above method.

24 Claims, 3 Drawing Sheets

(51) Int. Cl.
  *F02M 26/33* (2016.01)
  *F02M 26/34* (2016.01)
  *F02M 26/36* (2016.01)
  *F02M 26/49* (2016.01)

(52) U.S. Cl.
  CPC ............ *F02M 26/36* (2016.02); *F02M 26/49* (2016.02); *F02M 26/50* (2016.02)

(56) References Cited

U.S. PATENT DOCUMENTS

| | | | | |
|---|---|---|---|---|
| 7,131,263 | B1* | 11/2006 | Styles | F02M 26/35 |
| | | | | 60/297 |
| 8,887,702 | B2 | 11/2014 | Tomazic et al. | |
| 8,903,631 | B2* | 12/2014 | Klingbeil | F02D 41/0055 |
| | | | | 123/676 |
| 10,125,727 | B2* | 11/2018 | Hayashi | F02B 37/162 |
| 10,359,012 | B2* | 7/2019 | Kikuchi | F02M 26/22 |
| 2007/0137590 | A1* | 6/2007 | Vetrovec | F02B 37/00 |
| | | | | 123/25 A |
| 2010/0242929 | A1* | 9/2010 | Kardos | F02M 26/05 |
| | | | | 123/568.12 |
| 2011/0041814 | A1 | 2/2011 | Kardos et al. | |
| 2012/0048216 | A1 | 3/2012 | Tomazic et al. | |
| 2012/0323465 | A1* | 12/2012 | Peters | F02M 26/43 |
| | | | | 701/104 |
| 2012/0323470 | A1* | 12/2012 | Klingbeil | F02D 41/405 |
| | | | | 701/108 |
| 2016/0084204 | A1 | 3/2016 | Ge et al. | |
| 2016/0131088 | A1* | 5/2016 | Styles | F02M 26/05 |
| | | | | 123/568.12 |
| 2016/0245240 | A1 | 8/2016 | Pursifull et al. | |
| 2016/0281652 | A1 | 9/2016 | Takasu | |
| 2017/0101968 | A1* | 4/2017 | Hayashi | F02M 35/10157 |
| 2017/0114738 | A1 | 4/2017 | Hoard et al. | |
| 2017/0342949 | A1* | 11/2017 | Kikuchi | F02M 26/50 |
| 2018/0163675 | A1* | 6/2018 | Oshita | F02M 26/53 |
| 2020/0040852 | A1* | 2/2020 | Ueda | F02M 26/74 |
| 2021/0071664 | A1* | 3/2021 | Hughes | F04C 29/005 |
| 2021/0071667 | A1* | 3/2021 | Hughes | F04C 18/14 |
| 2021/0180533 | A1* | 6/2021 | Rahm | F02M 26/33 |
| 2021/0180545 | A1* | 6/2021 | Rahm | F02D 41/062 |
| 2021/0215123 | A1* | 7/2021 | Ueda | F02M 26/28 |

FOREIGN PATENT DOCUMENTS

| | | |
|---|---|---|
| CN | 104271906 A | 1/2015 |
| JP | 2010071186 A | 4/2010 |
| WO | 2009048408 A1 | 4/2009 |

OTHER PUBLICATIONS

Chinese Office Action dated Dec. 27, 2021 in corresponding China Patent Application No. 201880096795.7, 10 pages.

* cited by examiner

METHOD FOR OPERATING AN INTERNAL COMBUSTION ENGINE SYSTEM

CROSS-REFERENCE TO RELATED APPLICATIONS

This application is a U.S. National Stage application of PCT/EP2018/072723, filed Aug. 23, 2018, and published on Feb. 27, 2020, as WO 2020/038575 A1, all of which is hereby incorporated by reference in its entirety.

TECHNICAL FIELD

The invention relates to a method for operating an internal combustion engine system provided with e.g. an EGR system and a gas feeding device for feeding exhaust gas in the EGR system. The invention also relates to an internal combustion engine system, a vehicle and controlling devices for controlling the above method.

The invention can typically be applied in heavy-duty vehicles, such as trucks, buses and construction equipment, but can also be applied in other types of applications and in other types of vehicles and vessels. Although the invention will be described with respect to a truck, the invention is not restricted to this particular vehicle.

BACKGROUND

EGR (Exhaust Gas Recirculation) is a well-known means for reducing the amounts of nitrogen oxide (NOx) in the exhaust gas of internal combustion engines, for instance diesel engines arranged for propulsion of vehicles, such as trucks. A part of the exhaust gas is recirculated to the intake side of the engine, which lowers the maximum combustion temperature in the engine and reduces the production of NOx.

An EGR system can be arranged in different ways but includes at least some form of EGR channel that fluidly connects the exhaust side and the intake side of the engine. Commonly, an EGR system includes an EGR flow control valve and an EGR cooler.

Control of the EGR flow in EGR systems is associated with various challenges, such as fluctuating intake and exhaust pressures, hardware durability problems due to high exhaust gas temperatures and soot deposition, condensation and corrosion in EGR cooler, etc. A further challenge is that during certain operational conditions in many engine systems, and during most of the time for certain engine systems provided with an efficient turbo arrangement, the pressure at the intake side is higher than at the exhaust side so there is no driving force for recirculating the exhaust gas.

To overcome the challenge related to a higher pressure at the intake side than at the exhaust side U.S. Pat. No. 6,435,166 proposes the use of a gas feeder (i.e. an EGR pump/compressor) for feeding gas from the exhaust side to the intake side. Although such a gas feeder seems to solve the intended problem this solution is rare on commercial engines, possibly due to durability problems.

Alternative ways of dealing with a higher pressure at the intake side is to make use of a variable geometry turbo (VGT) arrangement for controlling the exhaust gas pressure (i.e. for keeping the exhaust gas pressure sufficiently high). A drawback of such a VGT arrangement is a fuel consumption penalty related to the increased exhaust back pressure. Another way is to supply EGR into the intake duct via a venturi nozzle. A drawback of venturis is that they are typically associated with a significant loss in pressure, in particular for large flows of gas. A further way is to generate a pulsed EGR flow by arranging a non-return valve in the EGR conduit that provides for a flow towards the intake side each time there is pulse of exhaust gas but where return flow between the pulses is prevented. A drawback related to pulsed EGR flow is difficulties in controlling the flow.

There is thus a need for an EGR system that provides for an effective and reliable recirculation of exhaust gas also when the pressure is higher on the intake side than on the exhaust side.

SUMMARY

An object of the invention is to provide a method and a device, which method/device provides for, compared to known methods and devices, a more effective and reliable recirculation of exhaust gas in an internal combustion engine system when the pressure is higher on the intake side than on the exhaust side.

According to a first aspect of the invention, the object is achieved by a method according to claim 1. According to a second aspect of the invention, the object is achieved by a device (engine system and vehicle) according to the independent device claim. According to a further aspect of the invention, the object is achieved by a computer-related product/medium or a control unit for controlling the method.

The method relates to a method for operating an internal combustion engine system, wherein the internal combustion engine system is provided with an air intake duct, an exhaust gas duct and an exhaust gas recirculation (EGR) system, wherein the EGR system comprises an EGR conduit that fluidly connects the exhaust duct and the intake duct, and wherein a gas feeding device configured to feed exhaust gas from the exhaust duct to the intake duct is arranged in the EGR conduit.

The method is characterized in that it comprises the step of: providing a flushing liquid in the EGR conduit upstream of the EGR gas feeding device so as to flush and clean the EGR gas feeding device as the flushing liquid follows the exhaust gas towards and into the EGR gas feeding device.

The flushing/washing liquid follows the EGR flow during operation of the engine system towards and into the gas feeding device where it will clean the gas feeding device by removing soot and other accumulated deposits from parts of the gas feeding device that are in contact with the EGR flow during operation of the engine. This improves/secures the functionality of the gas feeding device since, without cleaning, accumulated deposits are likely to interfere with the function of the gas feeding device (for instance, rotating parts might be prevented from rotating freely due to build-up of deposits in gaps between rotating and stationary parts).

The method thus provides for an effective and reliable recirculation of exhaust gas, in particular in an internal combustion engine system where the pressure is higher on the intake side than on the exhaust side, in that the method eliminates or at least reduces durability problems related to gas feeding devices used for feeding recirculated exhaust gas. In short, the method makes EGR gas feeding devices of interest for commercial engine systems.

Besides safeguarding function and reducing sticking risk etc. of the gas feeding device, the flushing/cleaning operation is useful also for reducing performance variation and for allowing the use of smaller tolerances that can be used to improve the efficiency of the gas feeding device, such as the use of smaller gaps in a displacement pump of e.g. a Roots blower type. Further, the gas feeding device can be used as an EGR valve, at least if using a displacement pump of e.g. the Roots blower type, which means that a separate EGR valve can be dispensed with.

Providing a liquid in the EGR conduit is contradictory to conventional safeguarding of EGR systems because measures are normally taken to avoid introduction or production (condensation) of liquids in the EGR system as this may result in corrosion or other damages. In addition, providing a liquid in a conduit upstream of a feeding device intended to feed gas, and not liquid, is generally also avoided as a precautionary measure.

Typically, the flushing liquid is water or a water-based liquid but may be e.g. an alcohol or an alcohol-water mixture or other type of liquid that may be stored in a separate tank. In principal, a portion of flushing liquid introduced into the EGR conduit may be in gas form before and/or during introduction, it could for instance be steam, but when the flushing liquid/fluid comes in contact with the gas feeding device it should be in liquid form to exhibit more efficient cleaning properties. The use of a flushing liquid that is in liquid form also before and during introduction into the EGR conduit is likely to be more efficient.

The amount of flushing liquid to be used in one flushing/cleaning step can be varied and may be adapted to, for instance, the size of the EGR conduit (which in turn may depend on the size of the engine), the current and earlier operational condition of the engine, and the time passed since the last flushing operation. The flushing operation may be allowed to continue for some time and may be repeated.

In an embodiment the method further comprises the steps of: condensing exhaust gas in or downstream an EGR cooling device arranged in association with the EGR conduit so as to form an EGR condensate, and using the EGR condensate as the flushing liquid. This is an efficient way of providing the flushing liquid since an EGR cooler capable of producing condensate normally is included in the system anyway. If the EGR cooling device is arranged upstream of the EGR gas feeding device the exhaust that is condensed in the cooling device or in the conduit between the cooling device and the gas feeding device is thus provided upstream of the gas feeding device. No additional hardware is required in such a case. The EGR conduit may, however, be designed to have a particular effect on the condensation, for instance by forming passages that enhances condensation at certain locations etc. If the cooling device is arranged downstream the gas feeding device a channel (and a valve) may be arranged for directing the condensate back to the EGR conduit upstream of the gas feeding device. Irrespectively of the relative flow order of the cooling device and the gas feeding device some sort of tank may be arranged for accumulating condensed exhaust gas and form a flush liquid supply. A channel may be arranged for guiding the condensate from such an accumulator tank in a controllable way to an inlet to the EGR conduit upstream of the EGR gas feeding device.

The engine system is typically operated to avoid or minimize condensation in the EGR. In an embodiment the engine system is controlled to produce (more) EGR condensate than during normal operation if needed, for instance by: i) operating the EGR cooling device with a high efficiency (by increasing a mass flow of a cooling medium and/or lowering the temperature of the cooling medium), ii) increasing the EGR mass flow (which leads to larger amounts of water in the EGR flow and thus a higher condensate production rate), iii) increasing the fraction of fuel in the air-fuel mixture combusted in the engine so as to produce exhaust gas with a higher concentration of water (e.g. by controlling the air inlet throttle valve to reduce the amount of air), and/or iv) operate the EGR system while the engine is cold (i.e. below normal operation temperature) so that also the exhaust gas is "cold" and easier to condensate efficiently.

In an embodiment the step of providing the flushing liquid in the EGR conduit upstream of the EGR gas feeding device comprises the step of: introducing at least part of the flushing liquid into the EGR conduit via a flush liquid channel arranged in fluid communication with a flush liquid tank and the EGR conduit. This is an alternative, or complement, to the step of providing the flushing liquid by condensing EGR directly in the EGR conduit. The liquid contained in the flush liquid tank may be EGR condensate that has been accumulated previously or another liquid, or a mix of EGR condensate and another liquid.

In an embodiment the method is carried out during cold start of the internal combustion engine system. The term "cold start" is a well-established term in the field of internal combustion engines and means in principle all situations where the temperature of the engine is below normal operational temperature, typically when the temperature of the engine cooling medium/water is below a certain level, e.g. 70° C. Flushing/cleaning of the gas feeding device can be used as a routine measure that always is conducted during cold start. Besides that it can be a good routine to always remove soot etc. in the gas feeding device at cold start, the EGR cooler produces more condensate when the engine is cold so if this condensate is used for flushing the gas feeding device it is likely that a good supply of flushing liquid can be provided during cold start.

The step of flushing the gas feeding device with flushing liquid may also be performed during normal operation of the engine system, i.e. when the engine has reached its normal operational temperature. The engine may be provided with a low-temperature path or loop for cooling medium to allow for production of larger amounts of condensate also during normal operation of the engine.

In an embodiment, the gas feeding device is configured to feed exhaust gas by means of at least one rotating member. Preferably, the gas feeding device is configured to feed exhaust gas by means of a displacement pump, preferably a Roots type blower having a pair of rotors provided with meshing lobes. Such a pump is suitable for feeding the exhaust gas but seems to be unreliable in this particular application if not subject to recurrent cleaning actions to remove depositions of soot etc., such as being flushed with a flushing liquid.

In an embodiment the method comprises the step of: detecting an indication of accumulated deposits of soot, hydrocarbons or other contaminants in the gas feeding device by determining whether a rotational friction of a rotary member of the gas feeding device exceeds a threshold value.

Even if the gas feeding device is subject to repeated flushing/cleaning, for instance at each cold start, various material may gradually accumulate in the gas feeding device during operation of the engine. Typically, material may accumulate in a gap between a rotary member and a stationary part of the gas feeding device. As mentioned above, the gas feeding device may, for instance, be a displacement pump of a Roots blower type having a pair of rotors provided with meshing lobes where there is a small gap between the lobes and the surrounding housing. When the gap starts to get closed by the deposited material it will gradually increase the rotational friction of the rotary member. At some point, or directly at start if the rotary member has got stuck, the rotational friction will be above the threshold value. This embodiment thus provides an indication on whether the gas feeding device needs to be cleaned or in some other way does not function as intended. This may be used as a trigger for performing the step of flushing the gas feeding with the flushing liquid (which step may very well be carried out also without any such trigger) but, as further described below, there are also other options available in case such an indication is provided, such as rotating the rotary member back and forth or by-passing the gas feeding device to allow continued operation of the engine even if the gas feeding device has got stuck or does not work for other reasons. The step of detecting an indication of accumulated deposits can be carried out during normal operation of the engine system, during start-up of the engine system (cold start) or when the "engine parts" (pistons, valves, turbo arrangement, etc.) of the engine system are not in operation. The gas feeding device may comprise one or more rotary members and the rotational friction may be determined for one or more of the rotary members.

In an embodiment the step of detecting an indication of accumulated deposits is carried out before the step of providing the flushing liquid in the EGR conduit. Determining that the rotational friction of the rotary member of the gas feeding device exceeds the threshold value can thus be used as a trigger for flushing the gas feeding device with the flushing liquid. Such a flushing operation can be a complement to regular flushing operations carried out without triggering based on rotational friction.

In an embodiment the determination of the rotational friction comprises one or more of the following steps:
measuring a torque applied to the rotary member;
measuring a driving power, such as a drive motor current, of a drive source arranged to drive the gas feeding device and rotate the rotary member;
measuring an actual rotational speed of the rotary member; and/or
measuring a response time of the rotary member between a change in driving power and a resulting change of rotational speed.

The rotational friction can thus be determined indirectly from different measurements and calculations and combinations thereof.

In an embodiment, in case an indication of accumulated deposits is detected, the method further comprises the step of: operating the rotary member in a reversed rotational direction, opposite to a rotational direction used under normal operational conditions. Changing the rotational direction can make the deposits come loose from the gas feeding device.

In an embodiment the rotary member is operated in the reversed rotational direction in a pulsed manner during a short period, wherein the pulsed reversed operation is followed by continued operation in the normal operational rotational direction. Firstly, operating the rotary member in the reversed direction only for a short time period is typically sufficient for removing the deposits. Secondly, reversing the direction only for a short time period does not have any significant effect on the general operation of the engine system. Preferably, the short period during which the rotary member is operated in the reversed direction is less than 10 s, preferably less than 5 s. The step of operating, in a pulsed manner, the rotary member in a reversed rotational direction may be repeated. As an alternative or combination, the method may comprise the step of operating the rotary member in a pulsed manner alternately in the reverse rotational direction and the normal rotational direction.

In an embodiment, in case an indication of accumulated deposits is detected, the method further comprises the step of: increasing a drive power of a drive motor arranged to drive the gas feeding device and the rotary member to a power level higher than a power level used under normal operational conditions. This may result in that the deposits come loose and can be used in combination with or as an alternative to operating the rotary member in the reversed direction.

In an embodiment, in case an indication of accumulated deposits is detected, the method further comprises the step of: guiding the flow of exhaust gas in the EGR conduit in a bypass conduit arranged in fluid communication with the EGR conduit upstream and downstream of the gas feeding device. This can be used as a form of emergency solution when rotary member has got stuck or the gas feeding device does not work at all for other reasons. The engine system can thereby still operate so the vehicle can still be used and does not need any immediate towing/rescuing. An engine break or variable geometry turbo may be arranged to increase the pressure in the exhaust duct so as to provide a drive for the EGR flow without the gas feeding device. Also an inlet throttle valve can be used to provide the EGR drive.

In an embodiment, in case an indication of accumulated deposits is detected, the method further comprises the step of: increasing the temperature of the exhaust gas flowing through the gas feeding device. This is useful for burning off hydrocarbons (fuel and oil residues) that might have accumulated in the gas feeding device. The temperature of the exhaust gas in the EGR conduit may be increased to around 120° C. or even up to around 150° C. for an efficient removal of hydrocarbons.

To increase the temperature of the exhaust gas flowing through the gas feeding device the method may comprise the step of: operating the internal combustion engine system so as to increase the temperature of the exhaust gas and/or reducing a cooling effect of an EGR cooling device arranged in the EGR conduit upstream of the gas feeding device. Reducing the cooling effect of the EGR cooling device includes e.g. turning the cooler off and making use of an EGR cooler by-pass channel.

According to the second aspect the invention relates to an internal combustion engine system provided with an air intake duct, an exhaust gas duct and an exhaust gas recirculation (EGR) system, wherein the EGR system comprises an EGR conduit that fluidly connects the exhaust duct and the intake duct, and wherein a gas feeding device configured to feed exhaust gas from the exhaust duct to the intake duct is arranged in the EGR conduit. The engine system is characterized in that it is configured to control anyone of the above method steps.

In an embodiment the engine system comprises a flush liquid channel arranged in fluid communication with a flush liquid tank and the EGR conduit, wherein the flush liquid channel is arranged to allow introduction of flushing liquid in the EGR conduit upstream of the EGR gas feeding device so as to allow flushing and cleaning of the EGR gas feeding device.

In an embodiment the engine system comprises an EGR cooling device arranged in association with the EGR conduit.

According to a variant of the second aspect the invention relates to a vehicle comprising an internal combustion engine system of the above type.

According to the further aspect the invention relates to:

a computer program product comprising program code means for controlling the steps of the above method when said program product is run on a computer;

a computer readable medium carrying a computer program comprising program code means for controlling the steps of the above method when said program product is run on a computer; and a control unit for controlling the internal combustion engine system of the above type, the control unit being configured to control the steps of the above method.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
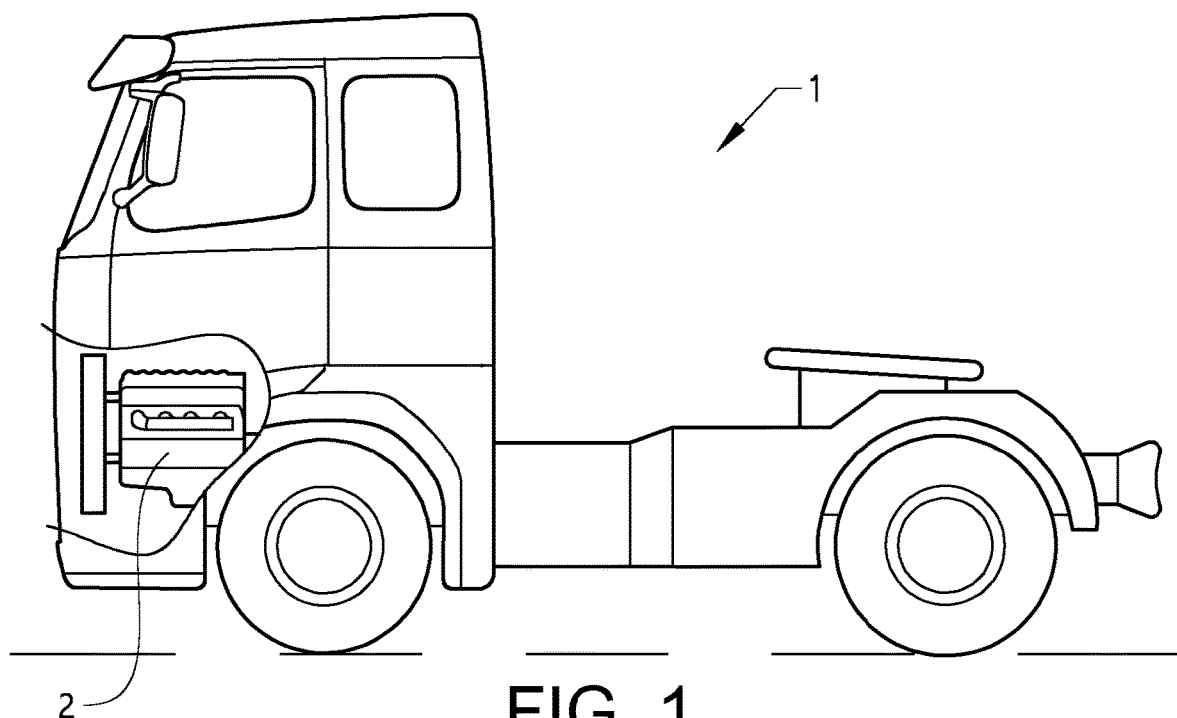
FIG. 1 is a schematic view of a vehicle/truck provided with an internal combustion engine system according to the invention.

FIG. 1 shows a schematic view of a truck 1 provided with an internal combustion engine system 2 according to the invention.

Figure 2:
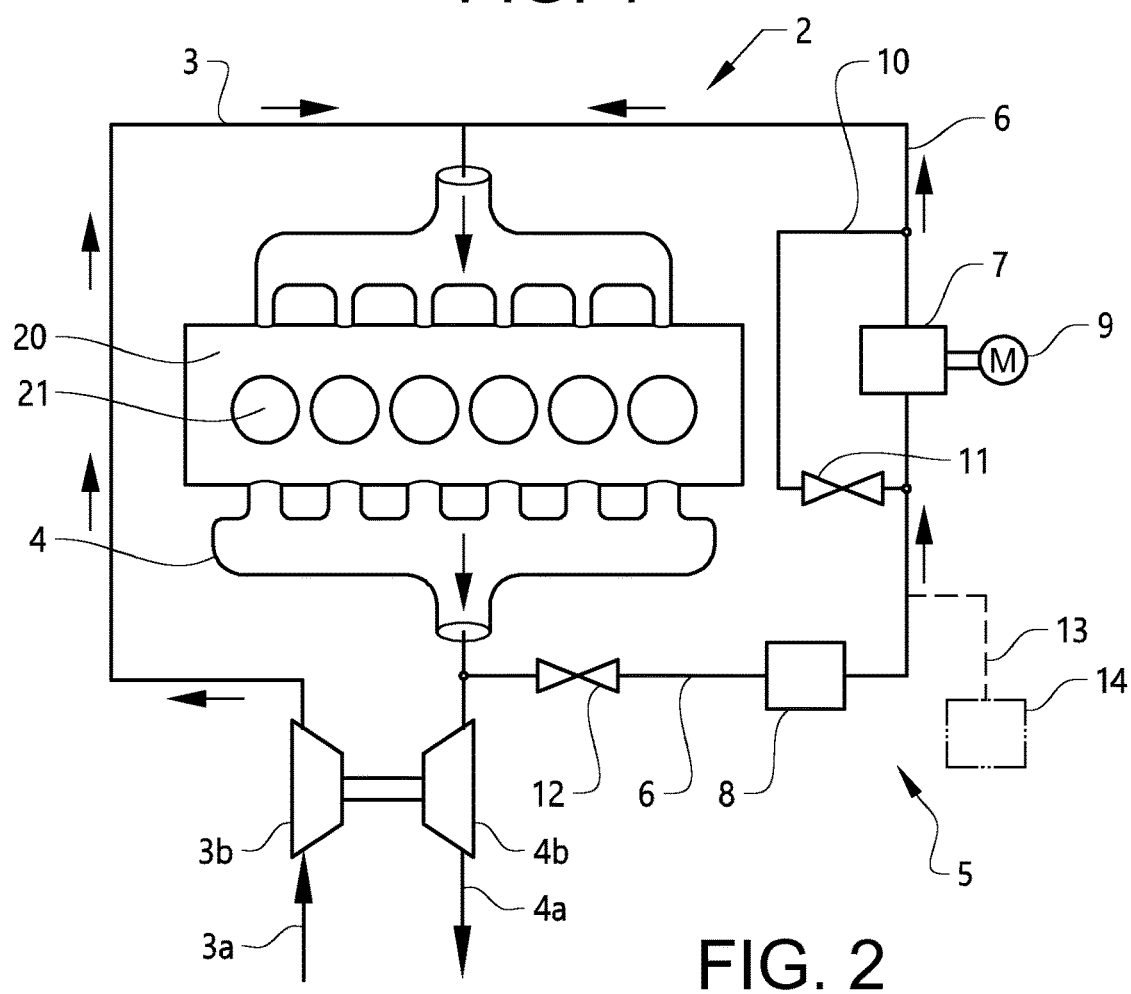
FIG. 2 is a schematic view of the internal combustion engine system according to FIG. 1.

FIG. 2 shows a schematic view of the internal combustion engine system 2 according to FIG. 1. The engine system 2 is provided with an air intake duct 3, an exhaust gas duct 4 and an exhaust gas recirculation (EGR) system 5. Intake air 3a is compressed in a turbo compressor 3b before entering the intake duct 3. Exhaust gas 4a leaves the schematically illustrated engine system 2 after having passed through an exhaust turbine 4b that drives the turbo compressor 3b. The air intake duct 3 guides air to a plurality of cylinders 21 (in this example six) arranged in an engine block 20 and the exhaust duct 4 leads the exhaust gas away from the cylinders 21 and the engine block 20.

In line with conventional engine systems each cylinder 21 is provided with a piston (not shown) as well as intake and exhaust valves (not shown), wherein the pistons are connected to a crankshaft (not shown) further connected to driving wheels of the vehicle 1 via various transmissions (not shown). Fuel supply and exhaust gas aftertreatment equipment is not shown in the figures.

The EGR system 5 comprises an EGR conduit 6 that fluidly connects the exhaust duct 4 and the intake duct 3. To provide for a flow of EGR when the pressure is higher in the intake duct 3 than in the exhaust duct 4 a gas feeding device 7 configured to feed exhaust gas from the exhaust duct 4 to the intake duct 3 is arranged in the EGR conduit 6. The gas feeding device 7 is in this example a Roots type blower (see FIG. 3). A drive motor 9, in this case an electric motor, is arranged to drive the gas feeding device 7, which in this case means that the drive motor 9 is arranged to rotate rotary members 71, 72 of the gas feeding device 7 (see FIG. 3).

The EGR system 5 further comprises: an EGR valve 12 for opening/closing of the EGR conduit 6 (the gas feeding device 7 can also function as EGR valve, see below); an EGR cooling device 8 arranged to allow for cooling of the exhaust gas flowing through the EGR conduit 6; an EGR bypass conduit 10 arranged in fluid communication with the EGR conduit 6 upstream and downstream of the gas feeding device 7 so as to allow for an EGR flow that by-passes the gas feeding device 7; and a bypass valve 11 arranged in the EGR bypass conduit 10.

FIG. 2 further indicates an optional flush liquid channel 13 arranged to fluidly connect an optional flush liquid tank 14 with the EGR conduit 6 upstream of the EGR gas feeding device 7 for introduction of a flushing liquid into the EGR conduit 6. The channel 13 and tank 14 may be used as an alternative or complement to the provision of flushing liquid directly in the EGR conduit 6 by means of condensation as will be described below.

The engine system 2 further comprises a control unit (not shown) configured to control parts and functions of the engine system 2 and to control e.g. all method steps described in this disclosure. The control unit receives information from various sensors (not shown) arranged in the engine system 2. The principle function of control units for controlling operation of internal combustion engines and engine systems is well known in the art.

During normal operation of the engine system 2 the pressure is higher in the intake duct 3 than in the exhaust duct 4, the EGR valve 12 is open, the bypass valve 11 is closed, and the gas feeding device 7 feeds exhaust gas through the EGR conduit 6 from the exhaust duct 4 to the intake duct 3. The gas feeding device 7 can function as an EGR valve by e.g. turning it off and lock it in a stationary (non-rotating) position that substantially prevents through-flow. This is done by controlling the electric drive motor 9. The EGR valve 12 is thus in this example not necessary. When the gas feeding device 7 is turned off and locked, opening of the bypass valve 11 allows for a flow of exhaust gas through the EGR bypass conduit 10. The gas feeding device 7 may be turned off but set in a mode that allows through-flow, i.e. the rotary members 71, 72 of the Roots blower are allowed to rotate.

Figure 3:
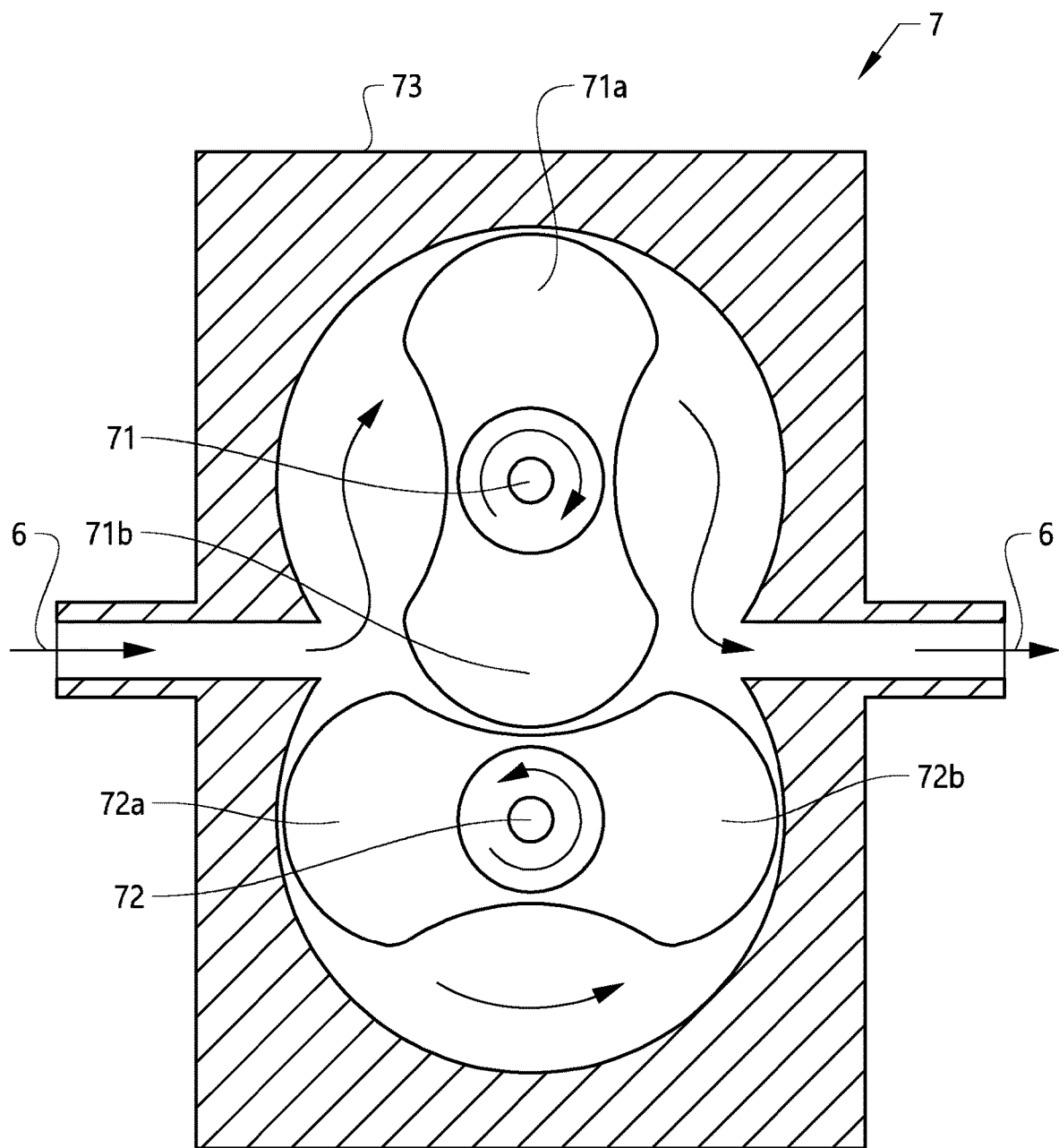
FIG. 3 is a schematic sectional view of a gas feeding device in the form of a Roots type blower.

FIG. 3 shows a schematic view of the gas feeding device 7 arranged in the EGR conduit 6, wherein the gas feeding device 7 is in the form of a Roots type blower having first and second rotary members 71, 72 provided with meshing lobes 71a, 71b, 72a, 72b configured to rotate inside a surrounding housing 73. Roots type blowers are well known as such. In some Roots type blowers each rotary member is provided with more than two lobes. In relation to FIG. 3 an incoming EGR flow in the EGR conduit 6 passes an inlet at the left and is displaced (as indicated by the arrows) by the rotary members 71, 72 to an outlet at the right and further into the EGR conduit 6 downstream of the gas feeding device 7 (towards the intake duct 3 and the cylinders 21 as indicated in FIG. 1).

Figure 4:
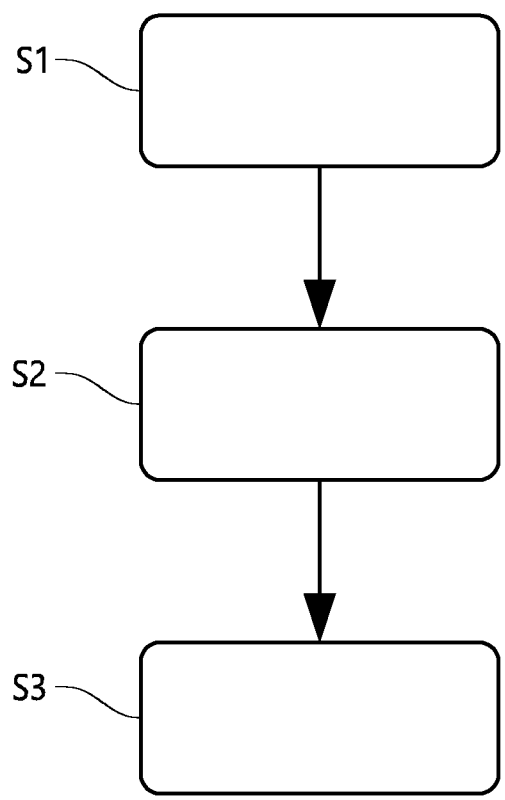
FIG. 4 is a flow diagram for an exemplary embodiment of the inventive method.

FIG. 4 shows a flowchart of an example of a method of operating the internal combustion engine system 2 where a flushing liquid in the form of EGR condensate is provided in the EGR conduit 6 upstream of the gas feeding device 7 for the purpose of flushing and cleaning of the EGR gas feeding device 7.

The example of FIG. 4 comprises the steps of:

S1—starting the engine system 2 (cold start), including operating the EGR system 5 (i.e. opening the EGR valve 12 if closed, starting the gas feeding device 7 and operating the EGR cooling device 8);

S2—providing flushing liquid/EGR condensate in the EGR conduit 6 upstream of the EGR gas feeding device 7 by operating the engine system 2 so that EGR exhaust gas condenses in or downstream the EGR cooling device 8; and S3—flushing and cleaning the EGR gas feeding device 7 by allowing the flushing liquid/EGR condensate to follow the recirculated exhaust gas towards and into the EGR gas feeding device 7 where it will remove at least some of any deposited material.

Steps S2 and S3 are carried out more or less simultaneously. Typically, step S3 does not require any particular action to be taken. Steps S2 and S3 may be regarded as one common step.

Step S2 may start almost immediately after step S1 depending on the situation, such as initial temperature of engine system and initial setting on parameters for controlling the operation of the engine system 2. If EGR condensate is not produced in sufficient amounts in step S2 this step can comprise the action of controlling the engine system 2 to produce more EGR condensate by e.g. increasing the efficiency of the EGR cooling device 8, increasing the mass flow of the exhaust gas flowing through the EGR conduit 6 and/or increasing the fraction of fuel in an air-fuel mixture that is combusted in the internal combustion engine system 2.

Steps S2 and S3 may be terminated after a certain time period or when the engine system 2 has reached a certain temperature (e.g. when the temperature of an engine cooling medium/water has reached a certain temperature).

In a variant of the above example step S2 is preceded by the step of:

S1'—detecting an indication of accumulated deposits of soot, hydrocarbons or other contaminants in the gas feeding device 7 by determining whether a rotational friction 30 of the rotary member 71, 72 of the gas feeding device 7 exceeds a threshold value, which, if the threshold value in step S1' is exceeded, can be followed by steps S2 and S3.

In this variant the engine system 2 may be operated under normal operating conditions during performance of step S1'. Whereas steps S2 and S3 in the example above are initiated as a response to cold start conditions (i.e. as a response to e.g. a low engine cooling medium temperature), these steps (S2 and S3) are carried out as a response to a high rotational friction of the rotary member 71, 72 of the gas feeding device 7 in the variant involving step S1'. Steps 2 and 3 may also be initiated as a response to e.g. the lapse of a certain time period since flushing of the gas feeding device 7 was carried out last time.

As a complement or alternative to steps S2 and S3 in case the threshold value in step S1' is exceeded, one or more of the following steps is/are possible:

operating the rotary member 71, 72 in a reversed rotational direction, opposite to a rotational direction used under normal operational conditions;

increasing a drive power of the drive motor 9 arranged to drive the gas feeding device 7 and the rotary member 71, 72 to a power level higher than a power level used under normal operational conditions;

guiding the flow of exhaust gas in the EGR conduit 6 in the bypass conduit 10; and/or increasing the temperature of the exhaust gas flowing through the gas feeding device 7.

These complementing or alternative steps are further described above.

As to the determination of the rotational friction of the rotary member 71, 72 of the gas feeding device 7 it may comprise one or more of the following steps:

measuring a torque applied to the rotary member 71, 72;

measuring a driving power, such as a drive motor current, of the drive motor 9;

measuring an actual rotational speed of the rotary member 71, 72;

measuring a response time of the rotary member 71, 72 between a change in driving power and a resulting change of rotational speed.

As an alternative or complement to the provision of a flushing liquid by generating EGR condensate directly in the EGR conduit 6 used in step S2, it is possible to introduce flushing liquid into the EGR conduit 6 from the flush liquid tank 14 via the flush liquid channel 13. The flush liquid tank 14 may contain previously accumulated EGR condensate or another liquid.

It is to be understood that the present invention is not limited to the embodiments described above and illustrated in the drawings; rather, the skilled person will recognize that many changes and modifications may be made within the scope of the appended claims.

The invention claimed is:

1. A method for operating an internal combustion engine system, wherein the internal combustion engine system is provided with an air intake duct, an exhaust gas duct and an exhaust gas recirculation (EGR) system, wherein the EGR system comprises an EGR conduit that fluidly connects the exhaust duct and the intake duct, and wherein a gas feeding device configured to feed exhaust gas from the exhaust duct to the intake duct is arranged in the EGR conduit, the method comprises:

detecting an indication of accumulated deposits of soot, hydrocarbons or other contaminants in the gas feeding device by determining whether a rotational friction of a rotary member of the gas feeding device exceeds a threshold value; and providing a flushing liquid in the EGR conduit upstream of the EGR gas feeding device so as to flush and clean the EGR gas feeding device as the flushing liquid follows the exhaust gas towards and into the EGR gas feeding device, wherein the detecting the indication of accumulated deposits is carried out before the providing the flushing liquid in the EGR conduit.

2. The method according to claim 1, wherein the method further comprises the steps of:

condensing exhaust gas in or downstream an EGR cooling device arranged in association with the EGR conduit so as to form an EGR condensate, and using the EGR condensate as the flushing liquid.

3. The method according to claim 2, wherein the method further comprises the step of:

controlling the operation of the internal combustion engine system so as to produce more EGR condensate than during normal operation of the internal combustion engine system.

4. The method according to claim 3, wherein the step of producing more EGR condensate comprises one or more of the following steps:

increasing the efficiency of the EGR cooling device;

increasing the mass flow of the exhaust gas flowing through the EGR conduit;

increasing the fraction of fuel in an air-fuel mixture that is combusted in the internal combustion engine system; and/or operating the EGR system while the internal combustion engine system has a temperature that is lower than a normal operation temperature.

5. The method according to claim 1, wherein the step of providing the flushing liquid in the EGR conduit upstream of the EGR gas feeding device comprises the step of:

introducing at least part of the flushing liquid into the EGR conduit via a flush liquid channel arranged in fluid communication with a flush liquid tank and the EGR conduit.

6. The method according to claim 1, wherein the method is carried out during cold start of the internal combustion engine system.

7. The method according to claim 1, wherein the gas feeding device is configured to feed exhaust gas by means of at least one rotating member.

8. The method according to claim 1, wherein the gas feeding device is configured to feed exhaust gas by means of a displacement pump, preferably a Roots type blower having a pair of rotors provided with meshing lobes.

9. The method according to claim 1, wherein the determination of the rotational friction comprises one or more of the following steps:

measuring a torque applied to the rotary member, measuring a driving power, such as a drive motor current, of a drive source arranged to drive the gas feeding device and rotate the rotary member, measuring an actual rotational speed of the rotary member, measuring a response time of the rotary member between a change in driving power and a resulting change of rotational speed.

10. The method according to claim 1, wherein, in case an indication of accumulated deposits is detected, the method further comprises the step of:

operating the rotary member in a reversed rotational direction, opposite to a rotational direction used under normal operational conditions.

11. The method according to claim 10, wherein the rotary member is operated in the reversed rotational direction in a pulsed manner during a short period, wherein the pulsed reversed operation is followed by continued operation in the normal operational rotational direction.

12. The method according to claim 11, wherein the short period during which the rotary member is operated in the reversed direction is less than 10 s, preferably less than 5 s.

13. The method according to claim 11, wherein the method comprises the step of:

repeating the step of operating, in a pulsed manner, the rotary member in a reversed rotational direction.

14. The method according to claim 11, wherein the method comprises the step of operating the rotary member in a pulsed manner alternately in the reverse rotational direction and the normal rotational direction.

15. A method according to claim 1, wherein, in case an indication of accumulated deposits is detected, the method further comprises the step of:

increasing a drive power of a drive motor arranged to drive the gas feeding device and the rotary member to a power level higher than a power level used under normal operational conditions.

16. A method according to claim 1, wherein, in case an indication of accumulated deposits is detected, the method further comprises the step of:

guiding the flow of exhaust gas in the EGR conduit in a bypass conduit arranged in fluid communication with the EGR conduit upstream and downstream of the gas feeding device.

17. A method according to claim 1, wherein the method further comprises the step of:

increasing the temperature of the exhaust gas flowing through the gas feeding device.

18. A method according to claim 17, wherein the method comprises the step of:

operating the internal combustion engine system so as to increase the temperature of the exhaust gas and/or reducing a cooling effect of an EGR cooling device arranged in the EGR conduit upstream of the gas feeding device.

19. The internal combustion engine system defined in claim 1, including an electronic control unit configured to perform the method of claim 1.

20. The internal combustion engine system according to claim 19, wherein the engine system comprises a flush liquid channel arranged in fluid communication with a flush liquid tank and the EGR conduit, wherein the flush liquid channel is arranged to allow introduction of flushing liquid in the EGR conduit upstream of the EGR gas feeding device so as to allow flushing and cleaning of the EGR gas feeding device.

21. The internal combustion engine system according to claim 19, wherein the engine system comprises an EGR cooling device arranged in association with the EGR conduit.

22. A vehicle comprising the internal combustion engine system according to claim 19.

23. A non-transitory computer readable medium carrying a computer program comprising program code for controlling the steps of claim 1 when said program product is run on a computer.

24. A control unit for controlling an internal combustion engine system, the control unit being configured to control the steps of the method according to claim 1.

* * * * *